United States Patent [19]

Irie et al.

[11] Patent Number: 5,605,779
[45] Date of Patent: Feb. 25, 1997

[54] OPTICAL MEMORY MEDIUM

[75] Inventors: Masahiro Irie, Kasuga; Kazuo Van, Nara, both of Japan

[73] Assignee: Sharp Kabushiki Kaisha, Osaka, Japan

[21] Appl. No.: 23,817

[22] Filed: Feb. 25, 1993

[30] Foreign Application Priority Data

Feb. 27, 1992 [JP] Japan .................. 4-041143

[51] Int. Cl.$^6$ ........................... G11B 7/24
[52] U.S. Cl. ........... 430/270.15; 430/962; 430/945; 369/284
[58] Field of Search ................. 430/945, 495, 430/962, 19, 270.15; 369/284

[56] References Cited

U.S. PATENT DOCUMENTS

| | | | |
|---|---|---|---|
| 4,837,063 | 6/1989 | Irie | 428/64 |
| 5,175,079 | 12/1992 | Van et al. | 430/338 |
| 5,281,501 | 1/1994 | Tatezono et al. | 430/21 |

FOREIGN PATENT DOCUMENTS

| | | |
|---|---|---|
| 2050070 | 3/1992 | Canada . |
| 0410879 | 1/1991 | European Pat. Off. . |
| 0470864 | 2/1992 | European Pat. Off. . |
| 0495185 | 7/1992 | European Pat. Off. . |
| 4100445 | 1/1992 | Germany . |
| 3075635 | 3/1991 | Japan . |
| 4010245 | 1/1992 | Japan . |
| 4242738 | 8/1992 | Japan . |

OTHER PUBLICATIONS

M. Irie et al., *Denshizairyo*, "Trend of the Development of Organic Photochromic Media", pp. 123–127 (Sep. 1991) (In Japanese – translation of certain sections provided).

M. Irie et al., *Organic Synthesis Chemistry*, 49:5, pp. 373–382 (May 1991) (In Japanese – translation of certain sections provided).

*Primary Examiner*—John A. McPherson
*Attorney, Agent, or Firm*—David G. Conlin; Linda M. Buckley

[57] ABSTRACT

An optical memory medium having a transparent substrate, a recording layer and a reflective layer, the recording layer and the reflective layer being formed in this order on the transparent substrate. The recording layer is a diarylethene derivative dispersed in a non-polar polymeric binder. The optical memory medium with such a recording layer fully utilizes advantageous properties of the diarylethene derivative, such as good thermal stability of recorded state, excellent durability against repeated color changes between colored and colorless states, and photosensitive property to semiconductor laser light with a wavelength of 780 nm. The optical memory medium enables high-density recording and non-destructive readout.

7 Claims, 3 Drawing Sheets

OPTICAL MEMORY MEDIUM

FIELD OF THE INVENTION

The present invention relates to an optical memory medium having a recording film including a photochromic material and a method of recording information on the same.

BACKGROUND OF THE INVENTION

Recently, the demand for optical large-capacity recording media capable of recording information at higher density grows year by year. In responding to such a demand, the development of magneto-optical memory media and phase-transition type memory media picks up speed. Also, the use of photochromic materials as recording materials is under research and development. An optical memory medium using a photochromic material is usually produced by forming on a glass or plastic transparent substrate an organic thin film including a photochromic material, such as spiropyrane, fulgide and diarylethene derivatives, and by further forming thereon a metal reflection film, such as aluminum and gold if needed.

Usually, when a colorless photochromic material is exposed to shortwave light such as ultraviolet light, it absorbs visible light and appears colored. On the other hand, when the photochromic material is exposed to visible light, it returns to its original colorless state. Such a color change takes places reversibly on irradiation of shortwave light and of visible light.

Recording, reproduction and erasure of information on such an optical memory medium including a photochromic material are performed using such a photochromic reaction. For example, visible light is irradiated on the entire surface of the optical memory medium to make the recording layer colorless. Then, recording of information is executed by irradiating ultraviolet light on the optical memory medium. Portions of the optical memory medium whereupon information has been recorded have color. Therefore, when visible light with a wavelength which does not cause a photochromic reaction is irradiated on the optical memory medium, the information is read out using a contrast between the colored portion and the colorless portion. When the colored portion is exposed to visible light with a wavelength causing a photochromic reaction and returned to the colorless state, erasure of information is carried out.

With this optical memory medium, it is possible to use shortwave light for reproducing information. Since the shortwave light achieves a light beam of a smaller diameter in comparison with visible light, it is preferable to use the shortwave light when reproducing bits which are recorded at higher density.

Photochromic materials having the above-mentioned properties are now under research and development and expected to be new recording materials for the next generation. In particular, diarylethene series materials attract attention as they show good thermal stability of the recorded information or colored state and excellent durability against repeated color changes. There is a report on a diarylethene derivative which is photosensitive to semiconductor laser light having a wavelength of 780 nm (Journal of Organic Synthesis Science Association, Vol. 49, 1991, p. 373).

With the prior art, such a photochromic compound is dispersed in a polymeric binder, including an acrylic resin such as PMMA (polymethyl methacrylate), a polycarbonate resin, and a polystyrene resin and then formed into a recording layer for a photochromic optical memory medium.

However, though the diarylethene series compounds have the above-mentioned advantageous properties, they show no photochromic reaction or show a weak photochromic reaction in the above-mentioned polymeric binders used for various purposes. Thus, there is a great demand for a polymeric binder which can satisfactory induce the advantageous properties of the diarylethene series compounds.

With a recording medium using a diarylethene series compound, even when information is read out by shortwave light with an intensity lower than that of light used for recording, the shortwave light causes a photochromic reaction in an unrecorded portion and the portion appears colored gradually. Accordingly, the contrast between the recorded portion and the unrecorded portion is gradually lessened, and those portions eventually have the same color. As a result, the recorded information is destroyed, causing non-destructive readout to be infeasible.

SUMMARY OF THE INVENTION

To solve the problem, it is an object of the invention to provide an optical memory medium utilizing advantageous properties of a diarylethene series photochromic compound. Another object of the invention is to carry out high-density recording and non-destructive readout with the optical memory medium.

In order to achieve the object, an optical memory medium of the present invention includes a recording layer formed by dispersing a photochromic material in a polymeric binder, wherein the photochromic material includes a diarylethene derivative represented by the formula

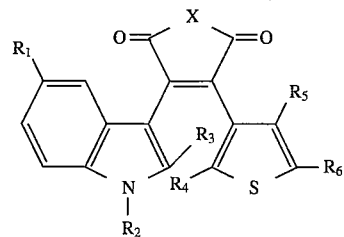

where $R_1$ is a hydrogen atom, an alkoxy group, or a straight-chain or branched alkyl group having from 1 to 20 carbons, each of $R_2$, $R_3$, $R_4$, and $R_5$ is a straight-chain or branched alkyl group having from 1 to 20 carbons, $R_6$ is a cyano group or an alkoxy carbonyl group, and X is an oxygen atom or a substituted or an unsubstituted nitrogen atom, and wherein said polymeric binder includes a non-polar polymeric molecule.

The recording layer of the optical memory medium is formed by dispersing the diarylethene derivative of the above formula in the binder including the non-polar polymeric molecule. In comparison with conventional recording layers formed by dispersing the diarylethene derivative in an acrylic resin and a polycarbonate resin, the recording layer of the present invention causes greater photochromic reaction.

Such an optical memory medium shows, for example, good thermal stability of the recorded information or colored state, excellent durability against repeated color changes between the colored and colorless states, and photosensitive property to semiconductor laser light having a wavelength of 780 nm. Accordingly, the recording layer formed in the above-mentioned manner can fully utilize advantageous effects of the diarylethene derivative.

In order to achieve another object of the present invention, a recording method of the present invention includes the step of recording information on the optical memory medium with recording light which is controlled such that the central portion of a beam of the light has a temperature not lower than a predetermined temperature.

When looking at a property of the recording layer of the optical memory medium with respect to room temperature and temperatures higher than the predetermined temperature, temperatures higher than the predetermined temperature facilitate a photochromic reaction of the recording layer. Therefore, during the recording of information, when the recording light is controlled to have the central portion having a temperature higher than the predetermined temperature, only the central portion of the light is actually used for recording information. Namely, the recording light is not entirely used for recording. It is thus possible to record on the optical memory medium a bit whose size is smaller than that of a portion exposed to the recording light, enabling high-density recording.

Moreover, when light with intensity lower than the intensity used during recording is irradiated on the recording layer during reproduction, a photochromic reaction does not occur in an unrecorded portion because a temperature rise in the unrecorded portion during reproduction is not as significant as that during recording due to its temperature properties. It is therefore possible to maintain the contrast between the recorded portion and the unrecorded portion and to perform non-destructive readout.

For a fuller understanding of the nature and advantages of the invention, reference should be made to the ensuing detailed description taken in conjunction with the accompanying drawings.

DESCRIPTION OF THE PREFERRED EMBODIMENT

The following description discusses one embodiment of the present invention with reference to FIGS. 1 through 4.

Figure 1:
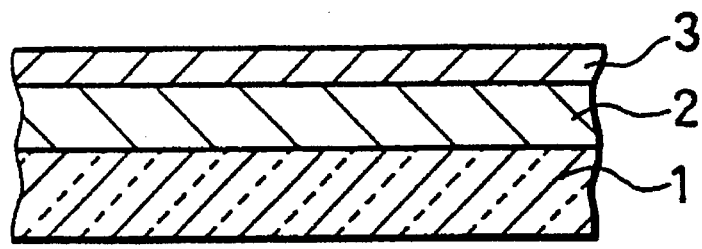
FIG. 1 is a cross sectional view showing the structure of an optical memory medium according to one embodiment of the present invention.
Figure 2:
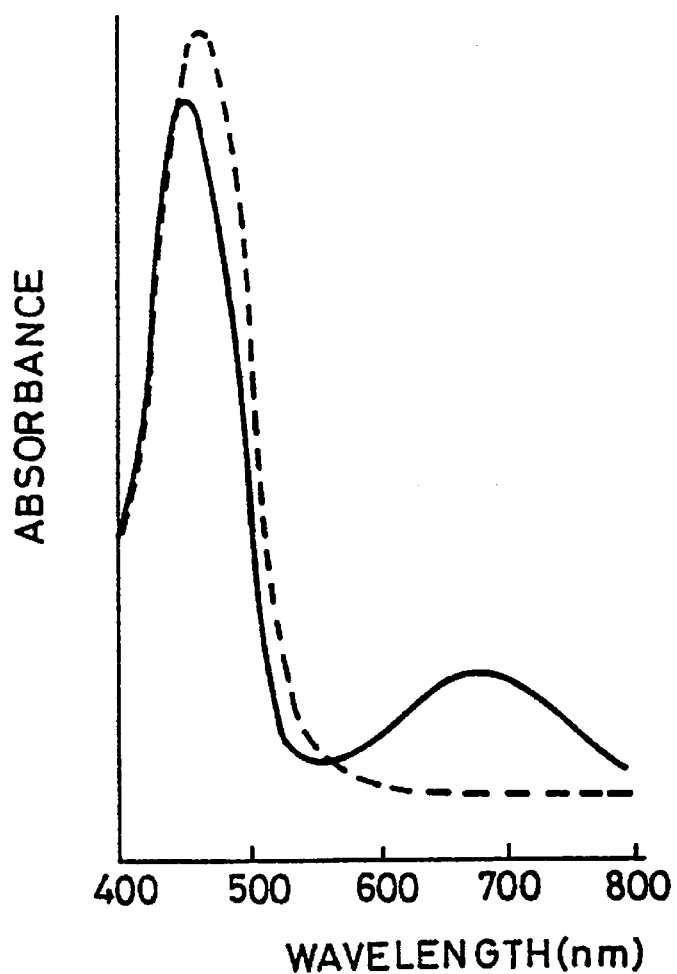
FIG. 2 is a graph showing the absorption spectra of a compound forming a recording layer of the optical memory medium when ring closure and ring opening take place.
Figure 3:
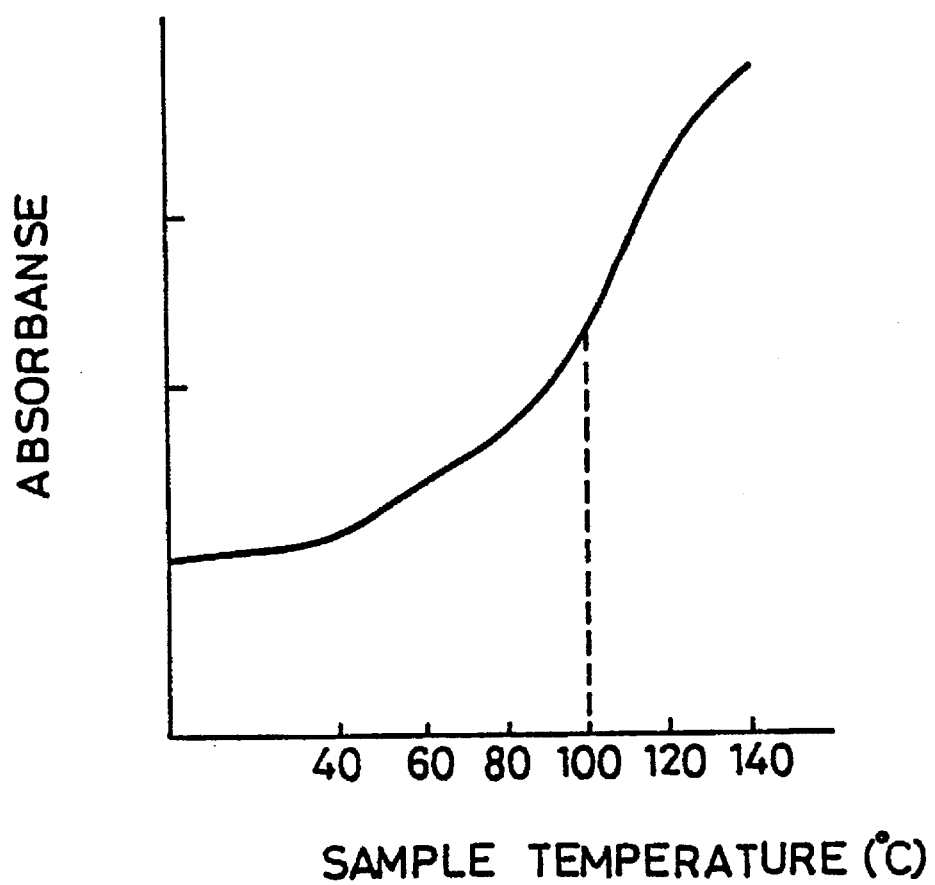
FIG. 3 is a graph showing the relations between the temperature and absorbance of the recording layer.

As illustrated in FIG. 1, an optical memory medium of the present invention includes a transparent substrate 1, a recording layer 2 formed on the transparent substrate 1, and a reflection layer 3 laminated on the recording layer 2.

The transparent substrate 1 is formed by, for example, glass or plastic such as polycarbonate, and carries the recording layer 2 and the reflection layer 3 thereon. The recording layer 2 on the transparent substrate 1 is formed by dispersing a diarylethene derivative represented by the above-mentioned general formula in a non-polar polymeric binder. The recording layer 2 thus formed is a photochromic medium and appears colored (i.e., ring closure takes place) when exposed to shortwave light, while it becomes colorless (i.e., ring opening takes place) when exposed to visible light. Namely, the recording layer 2 is isomerized to have different absorption bands.

The concentration of diarylethene derivative in the non-polar polymeric binder is preferably in the range of about 0.1 to 50 weight percent. For example, the recording layer 2 is a film with a thickness of about 0.1 to 100 μm, more preferably 0.1 to 10 μm, formed by spin coating. The reflection layer 3 is formed by metal, such as aluminum and gold, by sputtering or vapor deposition.

The above-mentioned description discusses only a basic structure of optical memory media, and therefore the present invention is not restricted by such a structure. Namely, an optical memory medium of the present invention may have a different structure if it includes a recording layer 2 formed by the above-mentioned diarylethene derivative dispersed in a non-polar polymeric binder. For example, it is possible to form a protective layer on the reflective layer 3 by an ultraviolet light hardening resin or to sandwich the recording layer 2 by transparent dielectric films.

Two following experiments were performed to study the photochromic properties of the recording layer 2 of the optical memory medium of this embodiment. Specifically, 2-(1,2-dimethyl-5-methoxy-3-indolyl)-3-(2-cyano-3,5-dimethyl-4-thienyl) maleic anhydride (hereinafter referred to as compound B) of the general formula

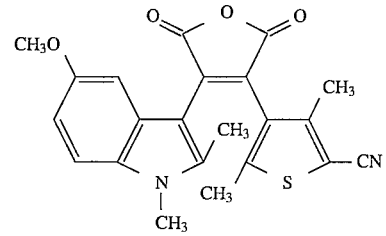

was dissolved in n-hexane and shortwave light with a wavelength around 440 nm is then irradiated on the compound B so as to cause ring closure and the compound B to have color. Next, a solvent was vapored and non-polar polymeric Zeonex 280 (produced by Nihon Zeon Kabushiki Kaisha) was mixed.

Zeonex 280 is a polyolefine series plastic represented by the general formula

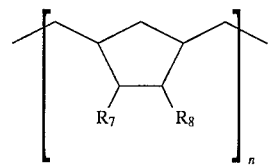

where $R_7$ and $R_8$ are $C_lH_m$. The concentration of the compound B with respect to Zeonex 280 was 0.5 weight percent. After dissolving the mixture in toluene, the resulting mixture was deposited on a surface of glass by casting and then baked at a temperature of 80° C. for three days so as to produce Sample a. Sample a was exposed to shortwave light with a wavelength around 460 nm and absorption spectrum was measured. The results are shown by the solid curbed line in FIG. 2.

The absorption spectrum of the compound B in the colorless state (ring is not formed) is shown by the broken line in the same figure. It was found that, when Sample a was exposed to shortwave light with a wavelength around 460 nm, it had an absorption band different from the absorption band observed when the compound B became colorless on the irradiation of light having a wavelength around 680 nm, and the compound B appeared colored or ring closure took place. Namely, a significant photochromic change was observed.

Additionally, Samples b to e were prepared by dispersing the compound B in PMMA ($M_W$=12000, produced by Aldrich Chemical Company Inc.), a polycarbonate resin ($M_W$=14000, produced by Mitsubishi Chemistry Industry, Ltd.), and in polystyrene resins ($M_W$=280000, 50000, produced by Aldrich Chemical Company Inc.), respectively, and depositing them on a glass surface in the same manner as when Zeonex 280 was used. Light with a wavelength around 480 nm was irradiated on Samples b to e, and absorption spectra were measured. Photochromic changes were observed, however, these changes were not as significant as that seen when Zeonex 280 was used.

The results show that, when the diarylethene derivative is dispersed in the non-polar polymeric binder, it causes a significant photochromic change. It is thus possible to provide an optical memory medium which fully utilizes advantageous properties of diarylethene derivative, such as good thermal stability of colored state, durability against repeated color changes between the colorless and colored states, and photosensitive property to a semiconductor laser with a wavelength of 780 nm.

Next, in order to study variations of photochromism with respect to changes in the temperature of the recording layer 2 formed by dispersing the diarylethene derivative in the non-polar polymeric binder, the following experiments were carried out.

First, to measure a change of absorbance with respect to light of a wavelength of 690 nm, light of a wavelength around 460 nm was irradiated on Sample a while heating the sample on a hotplate. The results shown in FIG. 3 indicate that absorbance increases as the temperature rises, and the absorbance changes significantly when the temperature exceeds 100° C. On the other hand, when the light of a wavelength around 460 nm is irradiated on Samples b to e while heating the samples to the vicinity of the glass transition temperatures of the respective binder resins on a hotplate, only small photochromic changes were observed.

It was discovered through these experiments that the recording layer 2 of the optical memory medium of this embodiment has such properties that, when the recording layer is heated to a predetermined temperature, it shows a greater photochromic change in comparison with a photochromic change at room temperature.

Figure 4A:
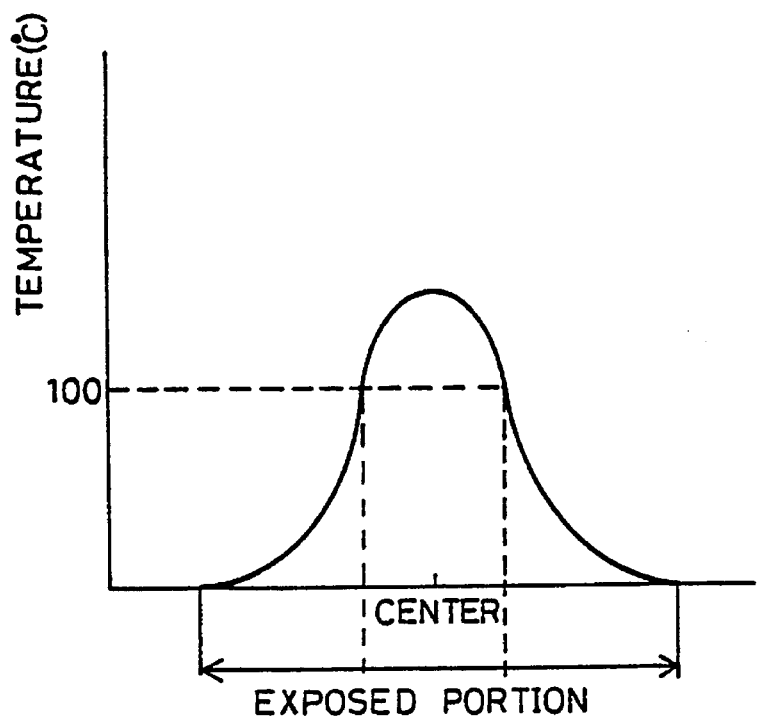
FIG. 4($a$) shows the temperature distribution of a portion of the optical memory medium exposed to laser light, and FIG. 4($b$) shows a variation in absorbance in the exposed portion.

Meanwhile, when the laser light is irradiated on the optical memory medium during recording of information, the region exposed to the light shows Gaussian light intensity distribution. Consequently, when the intensity of the recording laser light is set to a predetermined value, the exposed region has such a temperature distribution that only a portion corresponding to the center of a beam spot has an increased temperature as shown in FIG. 4(a).

Figure 4B:
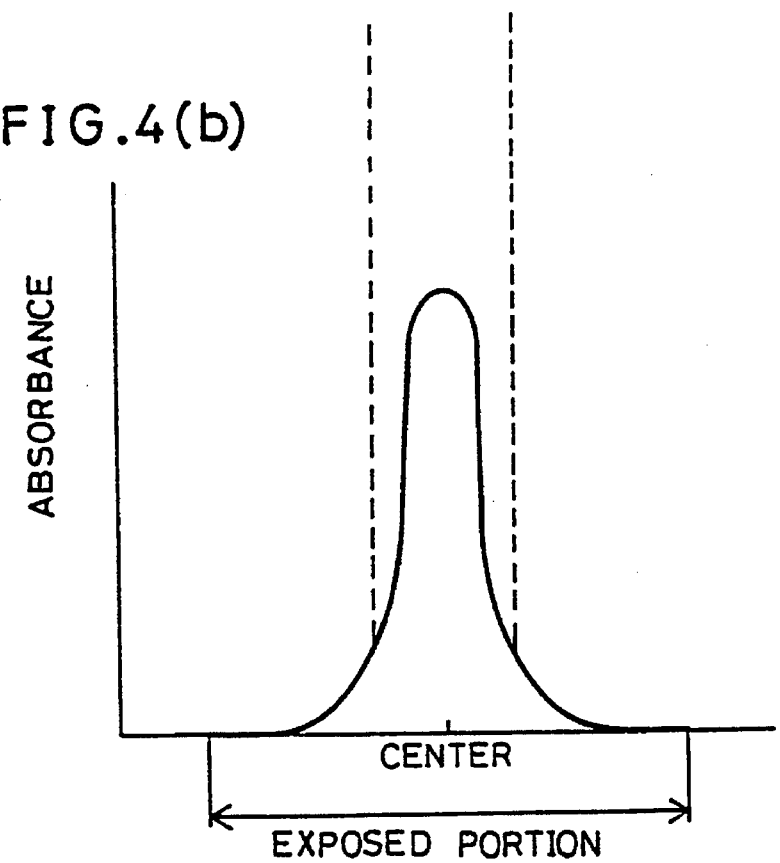

Therefore, when the intensity of the recording laser light is controlled to irradiate a recording beam such that a portion of the recording layer 2 corresponding to the center of the beam spot has a temperature causing a significant photochromic change, for example, 100° C. or above, the absorbance of the recording layer 2 with respect to the visible light has the distribution shown in FIG. 4(b) in the vicinity of the exposed region. As is clear from the figures, a significant photochromic change took place only at the central portion of the exposed region of the recording layer 2.

It is therefore possible to record a bit which is smaller than the size of a light spot of the recording laser light, enabling high-density recording.

Moreover, since the recording layer 2 shows a significant photochromic change when heated to the predetermined temperature or above, it is possible to perform non-destructive readout. More specifically, first, the optical memory medium shown in FIG. 1 is fully exposed to visible light to make the recording layer 2 colorless. Then, the recording layer 2 is caused to have color by shortwave light of high intensity so as to record information thereon. With this arrangement, even when shortwave light of low intensity is irradiated on the recording layer 2 during reproduction, the temperature of an unrecorded (colorless) portion is not raised so significantly compared to the temperature rise in recording. Thus, photochromic change is hardly observed and the contrast between the recorded portion and the unrecorded portion is preserved. This makes it possible to perform non-destructive readout, thereby preventing deterioration of reproduced signals.

However, a more detail study on the optical memory medium of this embodiment reveals that the irradiation of shortwave light during reproduction deteriorates the recorded portion. Namely, a gradual change from the colored state into the colorless state was observed. In order to perform more satisfactory non-destructive readout with the present invention, for example, it is effective to perform simultaneous irradiation of shortwave light and visible light as disclosed in "Denshizairyo", September 1991, p. 123.

In this embodiment, firstly, the recording layer 2 was made colorless by the visible light. High-intensity shortwave light was used for recording and low-intensity shortwave light was used for reproduction. However, the recording, reproduction and erasure of information are performed in the same way as in this embodiment by irradiating the light in the reversed manner. In this case, the recording layer 2 is firstly caused to have color by the high-intensity shortwave light. Next, it is turned into a colorless state by the visible light to record information thereon. Then, the information is reproduced by the shortwave light or the simultaneous irradiation of the shortwave light and visible light. This method also enables high-density recording and non-destructive readout.

The optical memory medium of this embodiment may be an optical disk, an optical card, or an optical tape. For instance, in the case of an optical tape, a flexible tape base is used instead of the transparent substrate 1. As for the material of the tape base, for example, polyethylene terephthalate is used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical memory medium comprising a recording layer formed by dispersing a photochromic material in a polymeric binder and a transparent substrate, wherein said photochromic material includes a diarylethene derivative represented by the formula

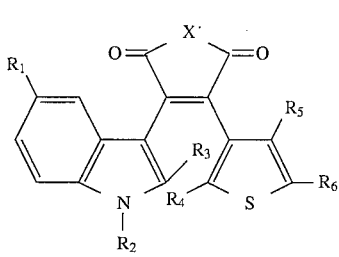

where $R_1$ is a hydrogen atom, an alkoxy group, or a straight-chain or branched alkyl group having from 1 to 20 carbons, each of $R_2$, $R_3$, $R_4$ and $R_5$ is a straight-chain or branched alkyl group having from 1 to 20 carbons, $R_6$ is a cyano group or an alkoxy carbonyl group, and X is an oxygen atom or a substituted or unsubstituted nitrogen atom, and wherein said polymeric binder includes a non-polar polymeric molecule having the repeating unit

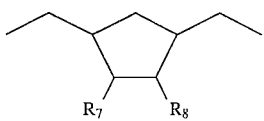

wherein $R_7$ and $R_8$ are a hydrocarbon.

2. The optical memory medium according to claim 1, wherein a concentration of said diarylethene derivative in said polymeric binder is in the range of 0.1 to 50 weight percent.

3. The optical memory medium according to claim 1, wherein a thickness of said recording layer is in the range of 0.1 to 100 μm.

4. The optical memory medium according to claim 1, wherein a thickness of said recording layer is in the range of 0.1 to 10 μm.

5. The optical memory medium according to claim 1, further comprising:

a first transparent dielectric film; and a second transparent dielectric film, wherein said recording layer and said second transparent dielectric film are formed in this order on said first transparent dielectric film.

6. The optical memory medium according to claim 1, further comprising:

a transparent substrate; and a reflective layer, wherein said recording layer and said reflective layer are formed in this order on said transparent substrate.

7. The optical memory medium according to claim 6, wherein a protective layer made of an ultraviolet hardening resin is formed on said reflective layer.

* * * * *

UNITED STATES PATENT AND TRADEMARK OFFICE
CERTIFICATE OF CORRECTION

PATENT NO. : 5,605,779
DATED : February 25, 1997
INVENTOR(S) : Irie et al.

It is certified that error appears in the above-identified patent and that said Letters Patent is hereby corrected as shown below:

On Cover Sheet, [73] Assignee:, line 1, insert "Masahiro Irie, Fukuoka, Japan" after --Osaka, Japan--.

Signed and Sealed this

Twenty-eighth Day of October, 1997

Attest:

BRUCE LEHMAN

Attesting Officer

Commissioner of Patents and Trademarks